United States Patent

Hume et al.

[11] Patent Number: 5,967,170
[45] Date of Patent: Oct. 19, 1999

[54] PRESSURE RELIEF PANELS

[75] Inventors: Alan Leslie Hume, Stafford; Cecil Derry, Staffs, both of United Kingdom

[73] Assignee: IMI Marston Limited, Wolverhampton, United Kingdom

[21] Appl. No.: 09/000,447
[22] PCT Filed: Jul. 29, 1996
[86] PCT No.: PCT/GB96/01824
§ 371 Date: Feb. 3, 1998
§ 102(e) Date: Feb. 3, 1998
[87] PCT Pub. No.: WO97/06378
PCT Pub. Date: Feb. 20, 1997

[30] Foreign Application Priority Data

Aug. 3, 1995 [GB] United Kingdom ............... 9515908

[51] Int. Cl.⁶ ........................................... F16K 17/16
[52] U.S. Cl. ................... 137/68.27; 220/203.08; 220/89.2; 59/98
[58] Field of Search .................. 137/68.27, 68.23; 220/89.2, 203.08; 52/98, 99

[56] References Cited

U.S. PATENT DOCUMENTS

| | | |
|---|---|---|
| 2,358,143 | 9/1944 | Castor .............................. 220/89.2 X |
| 2,679,467 | 5/1954 | Sherts ................................... 52/98 X |
| 3,109,554 | 11/1963 | Porter et al. ........................... 220/89.2 |
| 4,076,154 | 2/1978 | Fike, Jr. .................................. 52/99 |
| 4,207,913 | 6/1980 | Fike, Jr. ............................. 137/68.27 |
| 4,498,261 | 2/1985 | Wilson et al. ................... 220/89.2 X |
| 4,612,739 | 9/1986 | Wilson ............................. 220/89.2 X |
| 4,777,974 | 10/1988 | Swift et al. .................. 137/68.27 X |
| 4,821,909 | 4/1989 | Hibler et al. ..................... 220/203.08 |
| 5,036,632 | 8/1991 | Short, III et al. ................... 52/98 X |
| 5,082,133 | 1/1992 | Farwell et al. ........................ 220/89.2 |
| 5,368,180 | 11/1994 | Farwell et al. ................ 137/68.27 X |

FOREIGN PATENT DOCUMENTS

| | | |
|---|---|---|
| 1 018 688 | 10/1957 | Germany . |
| 2230333 | 12/1972 | Germany ............................. 220/89.2 |
| 3 142 345 | 12/1983 | Germany . |

*Primary Examiner*—John Rivell
*Attorney, Agent, or Firm*—Pillsbury Madison & Sutro LLP

[57] ABSTRACT

A pressure relief panel (1) for a vessel is mounted within a frame (11, 17) in the vessel wall. The panel (1) has a flap (3) which bursts open on predetermined over (or under) pressure within the vessel. The periphery of the flap (3) is at least partly defined by discontinuous edge slots or groove (5) with spaced interruptions (7). Outboard of each interruption (7) is a further slot (9) parallel to edge slot (5). Typically the edge slots are inboard of the edge (21) of the frame (11, 17) and sealed by a T-shaped sealing strip (22) which covers both slots.

7 Claims, 3 Drawing Sheets

PRESSURE RELIEF PANELS

TECHNICAL FIELD

The present invention relates to pressure relief panels and more particularly such panels that are flat or domed.

1. Background Art

Pressure relief panels are designed to act as sacrificial elements in a pressure vessel assembly/enclosed volume structure and are arranged to relieve pressure within the vessel assembly/structure at a predetermined pressure level. Traditionally, these pressure relief panels have comprised a burst panel with a sealing layer adhered to it and the whole secured to the vessel assembly using a frame and gasket. The burst panel may be slotted or grooved in order to control burst pressure accurately.

This composite layer pressure relief panel arrangement has several problems principally with regard to expense of manufacture both in that there are two elements and an adhesion stage and problems of maintenance to ensure the components remain adhered together.

2. Disclosure of Invention

It is an objective of the present invention to provide a pressure relief panel which substantially limits the above mentioned problems.

In accordance with the present invention, there is provided a pressure relief panel including a burstable portion or flap defined by a peripheral edge slot or groove, characterised in that the edge slot or groove is not continuous but has interruptions and that her slots or grooves are provided over a substantial portion of the flap periphery, each being associated with and adjacent to such interruptions.

The slots adjacent to the interruptions may be inboard or outboard of the edge slot. The panel may be flat or domed.

The panel may include interruptions without adjacent slots along one edge or part of an edge to act as a hinge for a flap displaced from the panel upon over-pressure. Alternatively, the hinge side may be left unslotted.

The slots, both edge slots and/or those adjacent to interruptions, may be completely through the panel or only partially through.

The slots, both edge slots and those adjacent to interruptions may be sealed by a gasket arranged in a panel mount for a pressure vessel/structure.

Either or both of the edge slots and the slots adjacent the interruptions may be sealed by a T-shaped sealing strip which covers the slot(s) and whose leg extends into one of the slots. Both sets of slots may be inboard of the mounting frame and the slot(s) sealed by such T-shaped sealing strip.

BRIEF DESCRIPTION OF DRAWINGS

An embodiment of the present invention will now be described by way of example only with reference to the accompanying drawing in which.

BEST MODE FOR CARRYING OUT THE INVENTION

Figure 1:
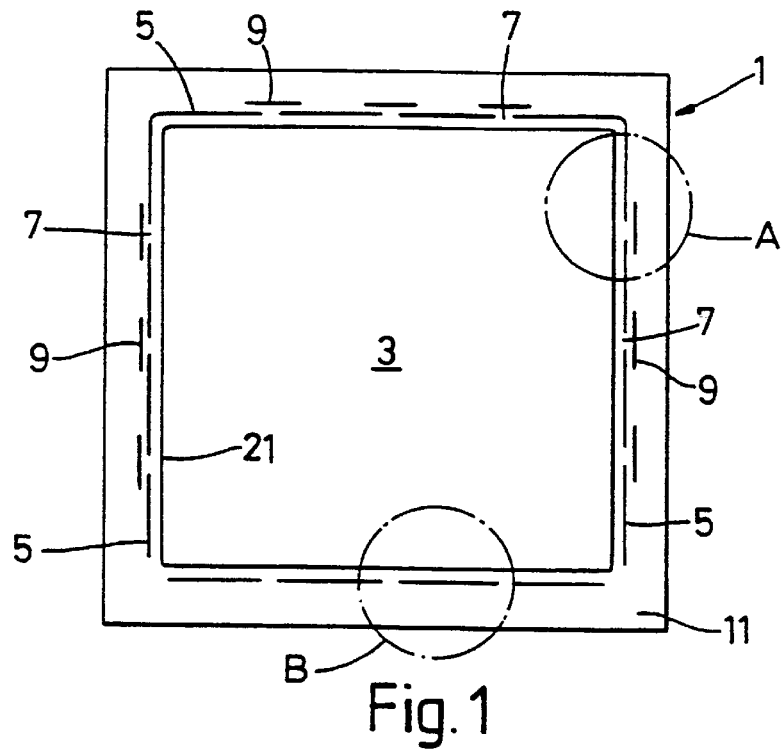
FIG. 1 illustrates in plan view a pressure relief panel with outboard slots adjacent to interruptions.

Consider FIG. 1. A pressure relief panel 1 has a panel flap 3 that may be flat or domed. This flap 3 is displaced when the pressure relief panel bursts. Around the flap 3, an edge slot or groove 5 is arranged to facilitate controlled rupture about the flap 3 upon over-pressure. This slot 5 is not continuous around the flap 3 but has regularly spaced slot interruptions 7 along each side. These slot interruptions 7 represent ligaments of panel material which ensure that although the slot 5 weakens the panel 1 it still retains some mechanical strength. This enables controlled flap burst with the interruptions 7 being associated with outboard adjacent slots 9 to ensure rupture of the interruptions 7 upon over pressure.

In order to ensure the flap 3 does not become detached from the panel 1, it is usual to have one edge or a portion thereof arranged as a hinge type attachment. Thus, in the embodiment illustrated three rupture sides of the panel 1 have the outboard adjacent slots 9 about the slot interruptions 7 whilst the fourth side, the hinge side, has no adjacent slots 9. With such an arrangement the three rupture sides will burst more readily than the hinge side. This allows pressure relief whilst ensuring the flap remains attached to the panel 1 through the hinge side. Zone A is representative of a rupture side slot interruption 7/adjacent slot 9 arrangement whilst zone B illustrates a hinge interruption.

The panel 1 is a single sheet or membrane of material which extends completely over a vent in a pressure vessel (not shown). Although evidently, a protective layer could be added if the pressure vessel/structure were designed to contain particularly corrosive material or if supplementary sealing was required. Typically, the slots 5, 9 are completely through the panel and sealed by a sealing gasket in a mounting frame, part of which is identified by numeral 11 in FIG. 1. Line 21 represents the inner edge of the mounting frame 11. However, it is also within the scope of the present invention, to have the slots 5, 9 only partially through the panel to allow positioning away from the mounting frame. Thus, the sealing gasket need not seal the slots.

Figure 2:
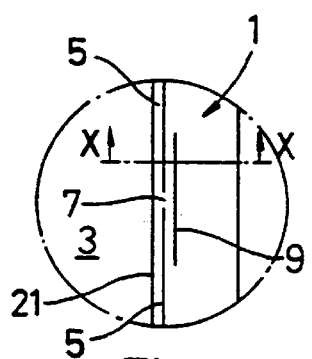
FIG. 2 illustrates an expanded view of area A from FIG. 1.
Figure 3:
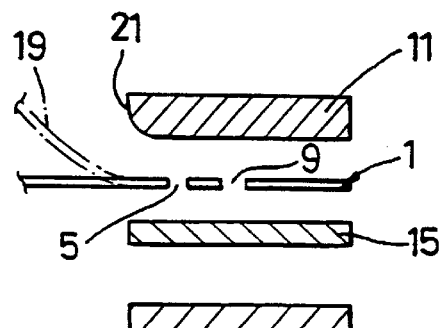
FIG. 3 is a cross-section across X—X of FIG. 2.

FIGS. 2 and 3 show zone A in greater detail. The outboard adjacent slot 9 extends parallel to the slot 5 and for a distance beyond the interrupt 7. The spacing between the slot 5 and adjacent slot 9 along with the distance of overlap is determined by the performance required of the panel 1. The distance of overlap is representative of the potential sites for rupture nucleation. Thus, by careful adjustment of panel 1 thickness, slot 5, interrupt 7 and overlap distance along with slot depth, a wide range of burst pressures can be achieved. The panel 1 is sandwiched between a pressure vessel ventside frame 11, a sealing gasket 15 and inlet frame 17. The gasket 15 is arranged to seal the panel 1 and slots 5, 7 in order to ensure the interior of the pressure vessel is environmentally isolated. A dome shaped pressure relief panel 19 is shown in ghost outline for comparison with the flat panel 1 illustrated. A domed panel may be adapted to burst conventionally or, if required, in a reverse buckling mode. The slots 5 and/or 9 may be formed on the flat flange or on the formed dome.

Figure 4:
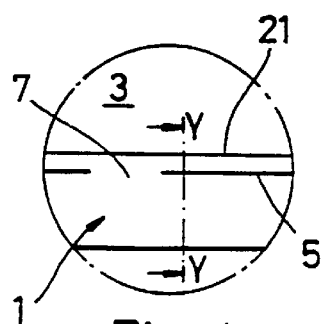
FIG. 4 illustrates an expanded view of area B from FIG. 1.
Figure 5:
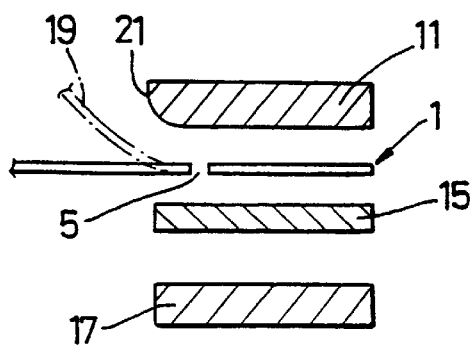
FIG. 5 is a cross-section across Y—Y of FIG. 4.

FIGS. 4 and 5 show zone B in greater detail. Slot 5 is still arranged about the panel 1 but the interrupt 7 is much wider and there is no adjacent slot. Thus, the hinge area (zone B) is far more resilient than the burst area (zone A) and is so designed to survive rupture. The flap 3 will consequently hinge about the hinge area (zone B) when the panel 1 bursts at burst areas (zone A). A dome shaped pressure relief panel 19 is shown in ghost outline for comparison with the flat panel illustrated.

It will be appreciated that there may be multiple interupt 7 and adjacent slot 9 combinations including for example one interrupt 7 and two adjacent slots 9 and vice versa. Slot 9 may run parallel to slot 5 or at an angle to it.

Figure 6:
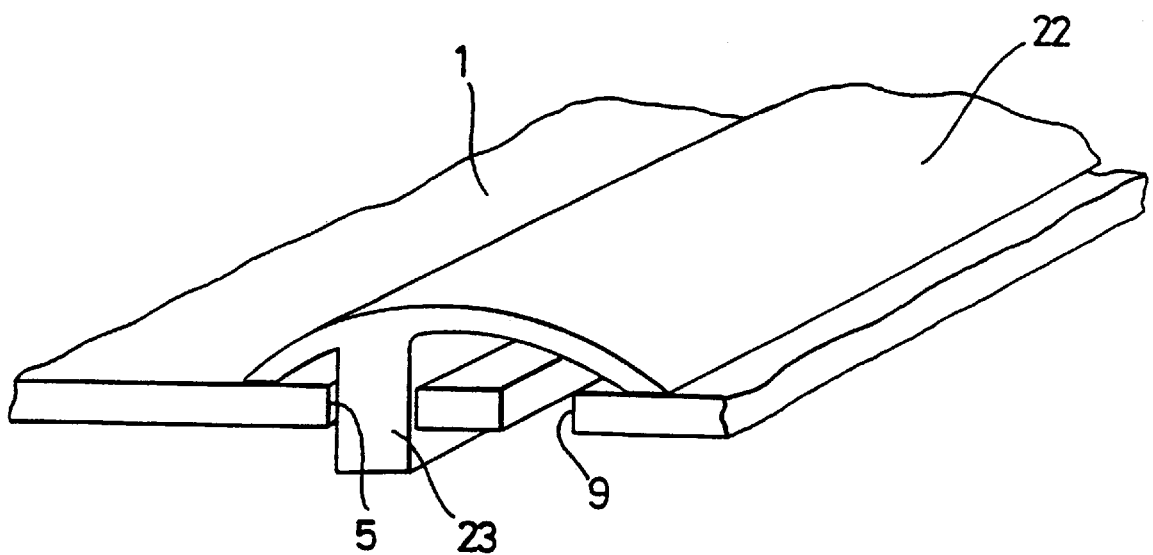
FIG. 6 shows a portion of a pressure relief panel with supplementary features according to the invention.

In FIG. 6, a portion of panel 1 in zone A is seen with a T-shaped sealing strip 22 in a suitable material such as plastics or rubber inserted into edge slot 5. This avoids the need for a separate gasket and simplifies assembly. Typically, the strip 22 covers both sets of slots 5 and 9 where they are present, although it may have only a single leg 23. Leg 23 extends along the length of strip 22 only where it is to be coincident with the presence of a slot. Other sealing sections may be used as required.

Figure 7:
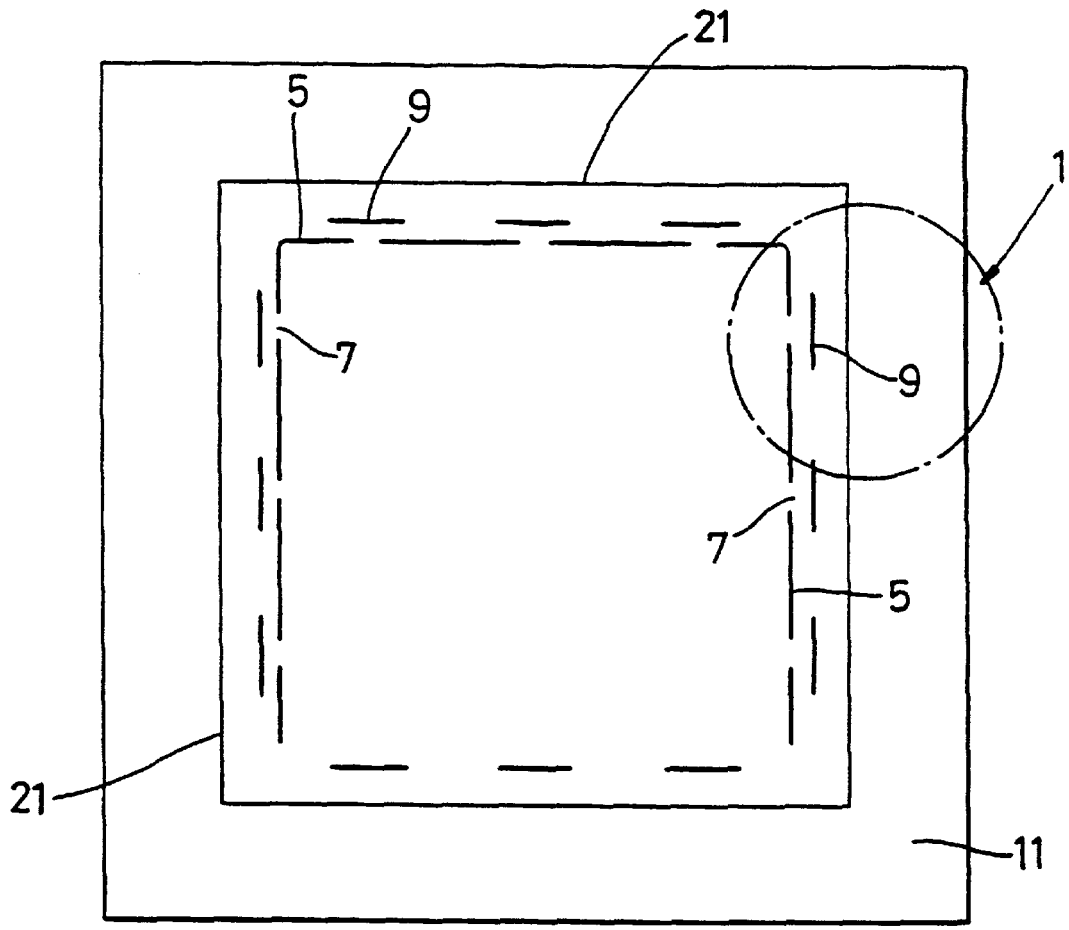
FIG. 7 illustrates a further embodiment of the invention from the same aspect as FIG. 1.
Figure 8:
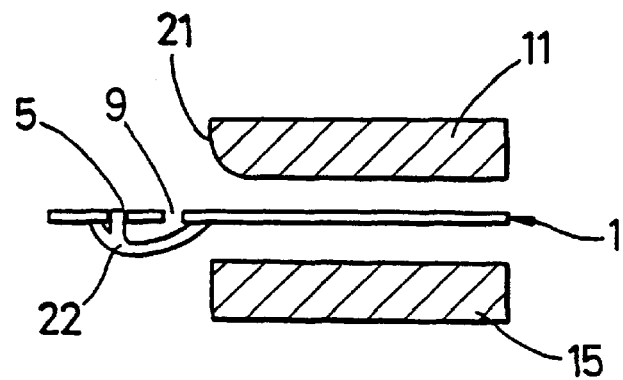
FIG. 8 is a cross-section of the further embodiment from the same aspect as that of FIG. 3.

FIGS. 7 and 8 illustrate the use of strip 22 when slots 5 and 9 are inboard of the edge of mounting frame 21. The preferred mode of the invention has slots inboard of the frame edge and uses strips 22 rather than an overall membrane seal. The views are equivalent to those of FIGS. 1 and 3 and like numerals are used when referring to like parts.

We claim:

1. A pressure relief panel including a burstable portion or flap (3) defined by a peripheral edge slot or groove (5), characterised in that the edge slot or groove (5) is not continuous but has interruptions (7) and that further slots or grooves (9) are provided over a substantial portion of the flap periphery, each being associated with and adjacent to such interruptions (7).

2. A pressure relief panel as claimed in claim 1 characterised in that the slots (9) adjacent such further slots (9) are outboard of the edge slots or grooves (5).

3. A pressure relief panel as claimed in claim 1 in which such further slots or grooves (9) are parallel to the edge slots or grooves (5).

4. A pressure relief panel as claimed in claim 1 characterised in that the panel (1) is substantially flat.

5. A pressure relief panel as claimed in claim 1 characterised in that all edges of flap (3) except that about which the flap (3) hinges have such further slots or grooves (9).

6. A pressure relief panel as claimed in claim 1 characterised in that the edge slot or groove (5) and the further slots or grooves (9) adjacent to the interruptions (7) are sealed by a T-shaped sealing strip (22) having a leg (23) extending into the edge slot or groove.

7. A pressure relief panel as claimed in claim 1 and which is retained in a mounting frame characterised in that the edge slot or groove (5) and the further slots or grooves (9) adjacent to the interruptions (7) are both inboard of said mounting frame.

* * * * *